(12) United States Patent
Zhang et al.

(10) Patent No.: US 6,671,011 B1
(45) Date of Patent: Dec. 30, 2003

(54) DISPLAY DEVICE HAVING A PORTABLE STICK-SHAPED HOUSING WITH AN EXTENDABLE AND RETRACTABLE SCREEN

(75) Inventors: Rui Zhang, Scarborough (CA); Jari Vaario, Tokyo (JP)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/474,447

(22) Filed: Dec. 29, 1999

(51) Int. Cl.[7] .............................................. G02F 1/1333
(52) U.S. Cl. ............................................ 349/58; 349/12
(58) Field of Search ............................. 345/169; 349/58, 349/12, 1

(56) References Cited

U.S. PATENT DOCUMENTS

| | | | | |
|---|---|---|---|---|
| 5,646,649 A | * | 7/1997 | Iwata et al. ................. 345/173 |
| 5,710,576 A | * | 1/1998 | Nishiyama et al. .......... 345/169 |
| 5,933,203 A | | 8/1999 | Wu et al. |
| 6,037,954 A | * | 3/2000 | McMahon ................... 345/169 |
| 6,229,694 B1 | * | 5/2001 | Kono .......................... 361/683 |
| 6,313,828 B1 | * | 11/2001 | Chombo ...................... 345/169 |

FOREIGN PATENT DOCUMENTS

| | | | | |
|---|---|---|---|---|
| EP | 0 424 074 A2 | 4/1991 | ............. G06F/1/16 |
| EP | 0 776 140 A1 | 11/1995 | ............. H04Q/1/32 |
| WO | WO 98/03962 | 1/1998 | ............. G09G/3/12 |

\* cited by examiner

*Primary Examiner*—Toan Ton
(74) *Attorney, Agent, or Firm*—Cohen, Pontani, Lieberman & Pavane

(57) ABSTRACT

A display device comprising a stick-shaped housing holdable in one hand and a screen, made from cholestric liquid crystal material, extendable from the housing to provide a display for the user.

18 Claims, 6 Drawing Sheets

DISPLAY DEVICE HAVING A PORTABLE STICK-SHAPED HOUSING WITH AN EXTENDABLE AND RETRACTABLE SCREEN

FIELD OF THE INVENTION

The present invention relates to a display device.

BACKGROUND OF THE INVENTION

In known portable devices including displays, a balance always has to be struck between portability and usability. For example, currently, a notebook PC is too big to be conveniently carried, although the display is adequate. Whereas, a palmtop computer is small enough to be carried unobtrusively, but the user has to put up with a small display.

SUMMARY OF THE INVENTION

With this in mind, according to one aspect, the present invention may provide a display device comprising a stick-shaped housing holdable in one hand, and an electronically-writeable screen extendable from the housing to provide a display for the user.

In this way, the present invention is able to provide a display which is very convenient to transport, yet provides an adequate screen when needed.

Preferably, the display device includes a user control on the housing by which the user can adjust the degree to which the screen is extended.

This feature is advantageous in that it enables the user to extend the screen of display device to the extent permitted by the circumstances, whereby the display device may be used in even very cramped situations such as on commuter trains.

Preferably, the display device comprises a window formed in the housing through which a portion of the screen material is viewable when in its first position. The visible portion of the display can then be used to display a limited amount of key information to the user, even when the display material is in its first position.

According to a further aspect of the invention, the present invention may provide a personal communication device comprising a display device as hereinbefore discussed and a radio interface.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views.

DETAILED DESCRIPTION OF THE PRESENTLY PREFERRED EMBODIMENTS

Figure 1:
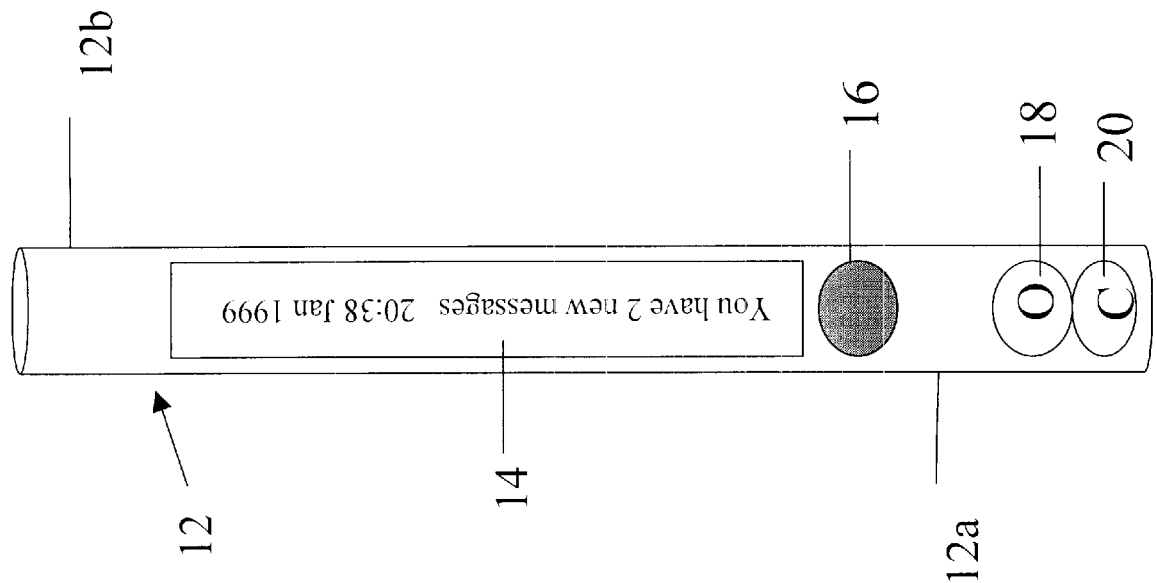
FIG. 1 shows an embodiment of the invention in the closed position.

Referring to FIG. 1, a personal communication device 10 of the present invention comprises a stick-shaped housing, generally designated 12, which is sized to be conveniently held in one hand. The housing 12 has a first end 12a and a second end 12b, and is provided longitudinally along the length thereof with a transparent window 14. At the first end 12a of the housing 12, a 5-position, roller-ball mouse 16, an 'open' button 18 and a 'close' button 20 are provided.

Figure 2:
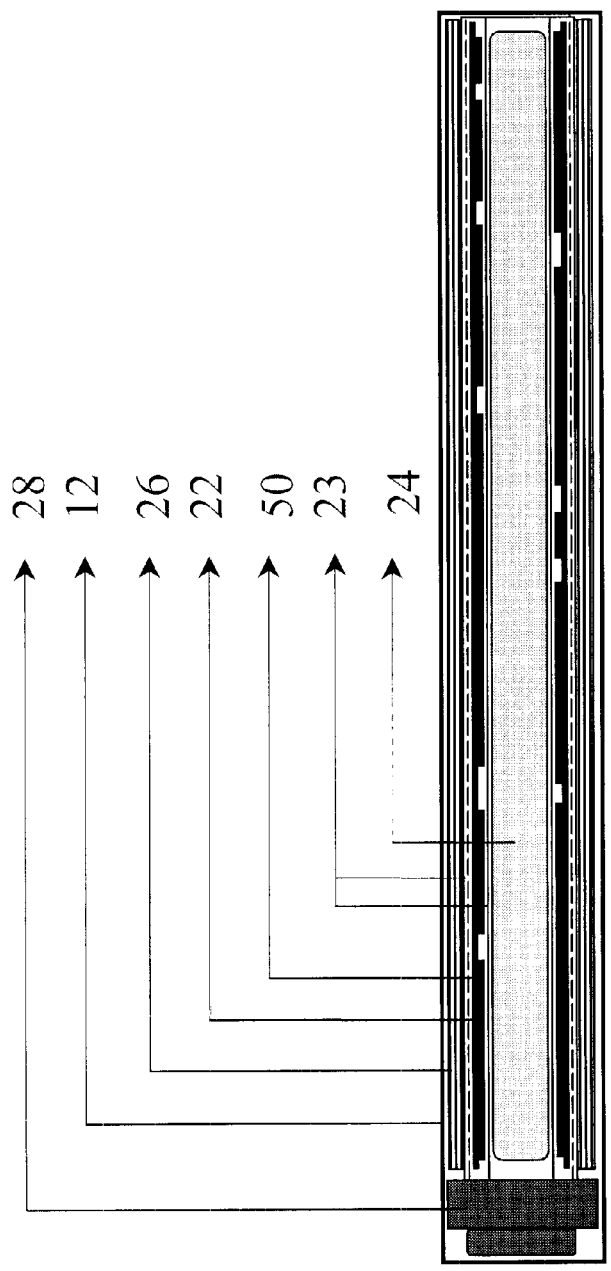
FIG. 2 shows a longitudinal cross-section of the embodiment of FIG. 1.
Figure 3:
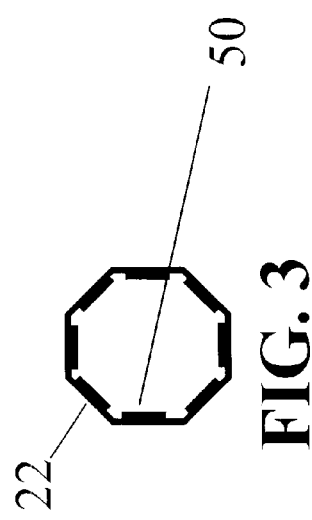
FIG. 3 shows a cross-sectional view of the printed circuit board (PCB) shown in FIG. 2.

Referring to FIG. 2, within the housing 12 a hexagonal printed circuit board (PCB) 22 is mounted. On the inside surface of the PCB 12, the circuitry 50 necessary to control the operation of the device is laid out. This circuitry 50 is closed from the volume surrounded by the PCB 12 by a component cover 23. Within the volume enclosed by the component cover 23, a battery 24 for powering the device is located. The battery 24 is replaceable and can be removed from the second end 12b of the housing 12. Electronically-writeable screen material 26 is rolled around the PCB 22. The display material 26 can be cholestric display material, including cholestric liquid crystals. A motor 28 is mounted at the first end 12a of the housing 12. The motor 28 is coupled to the screen material 26.

Figure 4:
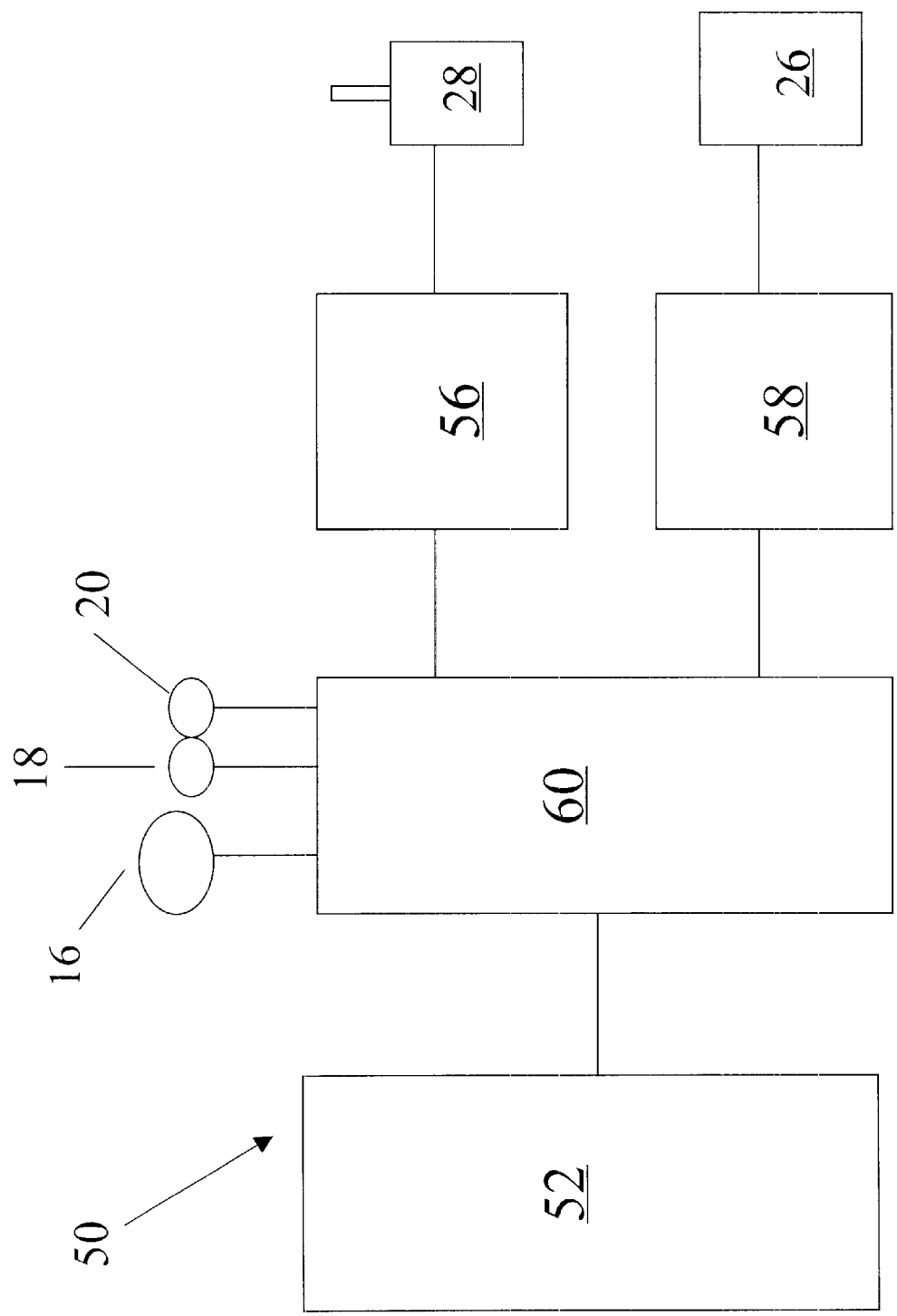
FIG. 4 shows a functional block diagram of electronic components of the FIG. 1 embodiment.

Referring to FIG. 4, the circuitry 50 comprises a radio interface 52, including an internal antenna capable of both data reception and transmission; a motor driving unit 56 for driving the motor 28; a display driver 58 for writing to the screen material 26, for example, in accordance with U.S. Pat. No. 5,933,203, the disclosure of which is incorporated herein by reference; and a control unit 60 for coordinating the overall operation of the device, including directing the operation the radio interface 52, the motor driving unit 56 and the display driver 58. The control unit 60 is also responsive to the mouse 16, and open and close buttons 18 and 20, respectively.

Referring again to FIG. 1, the device 10 is in its standby mode in which the screen 26 is fully scrolled-up within the housing and only a small portion of the screen, hereinafter referred to as the window display, is visible through the window 14. The window display shows key information to the user. In this instance, the time and the fact that the device has received new messages. In the standby mode, the radio interface 52 maintains contact with a cellular network and can accept incoming messages.

Figure 5:
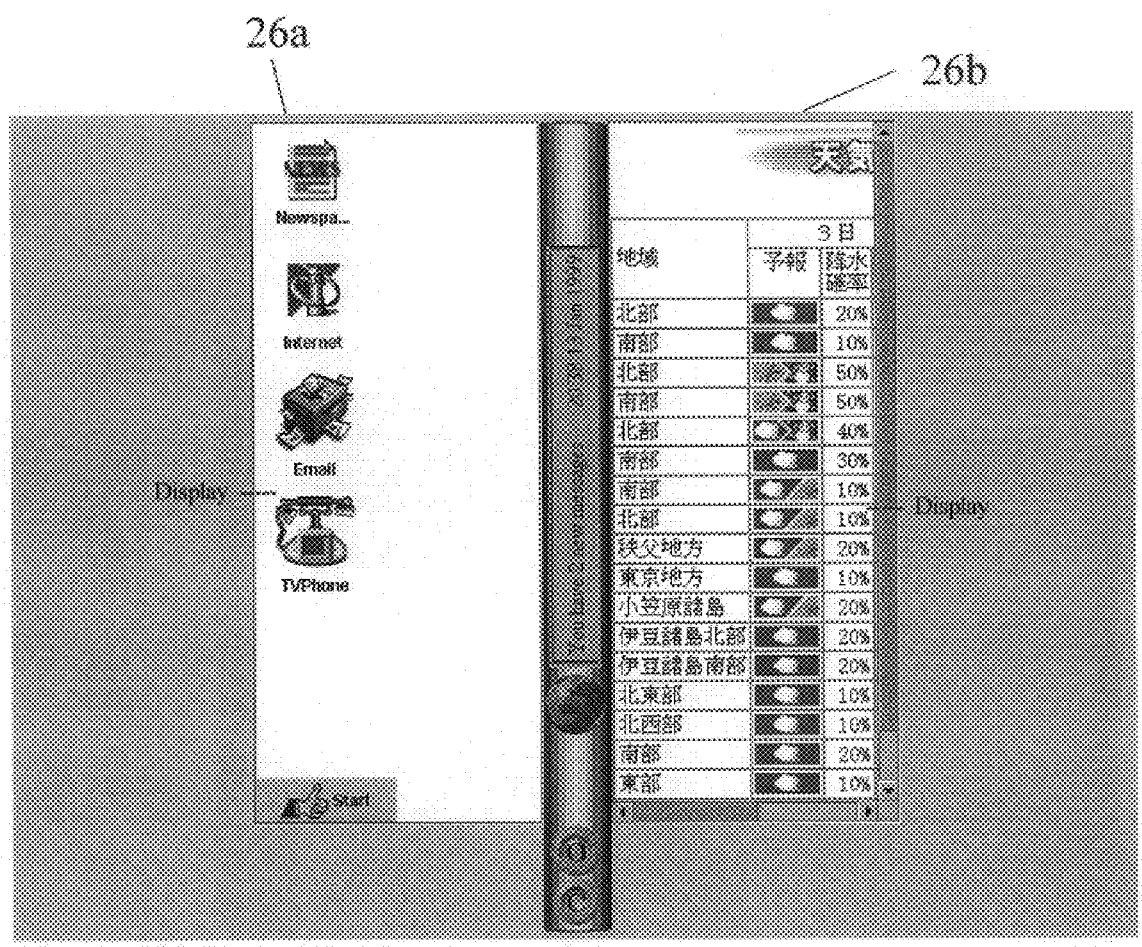
FIG. 5 shows the embodiment of FIG. 1 in a partly-opened position.

When the user wishes to make active use of the device 10, he might, for example on a commuter train, chose to unscroll the screen to only the extent shown in FIG. 5 because the train is crowded. He does this by depressing the open button 18 for a predetermined duration. The button depression is detected by the control unit 60. While the key is depressed, the control unit 60, via the motor controller 56, drives the motor 28, thereby causing the screen portions 26a and 26b to be steadily unscrolled from the housing 12 and extend laterally from the housing. Once the open button is released, the unscrolling terminates. The material of the display may have sufficient rigidity itself to maintain its planar form as it is being unscrolled. With some display materials this may not be the case, and the material can be provided with a thin metal backing which can be rolled and unrolled with the screen to impart the necessary structural rigidity. The backing may take the form, for example, of a thin border running around the edges of the screen or a framework extending over the back of the screen. It will be noted that the height of the screen is less than that of the housing. The reason for this is to create a region at one end of the housing 12 by which the housing can be readily held by the user during the rolling out or rolling up of the screen without the screen interfering with the user's hands. The buttons 18, 20 and the mouse 16 are positioned proximate to this end region.

On the left-hand screen portion 26a, the user is presented with a series of icons indicating the various services the device 10 supports and can access over the air using its radio interface 52. As shown in FIG. 5, these include "newspaper", "internet", "email", "TV phone". By moving the screen cursor (not shown) using the mouse 16, the user is able to select the required service. The newspaper service accesses, over the air via the internet or via a dedicated server, the user's regular newspaper. On the right hand screen 26b, there is shown weather forecast information. The device 10 formats the data it is displaying according to the current extend to which the screen is unscrolled. This is very much like a Microsoft's Windows application, but, of course, in this case the physical display area actually varies.

Figure 6:
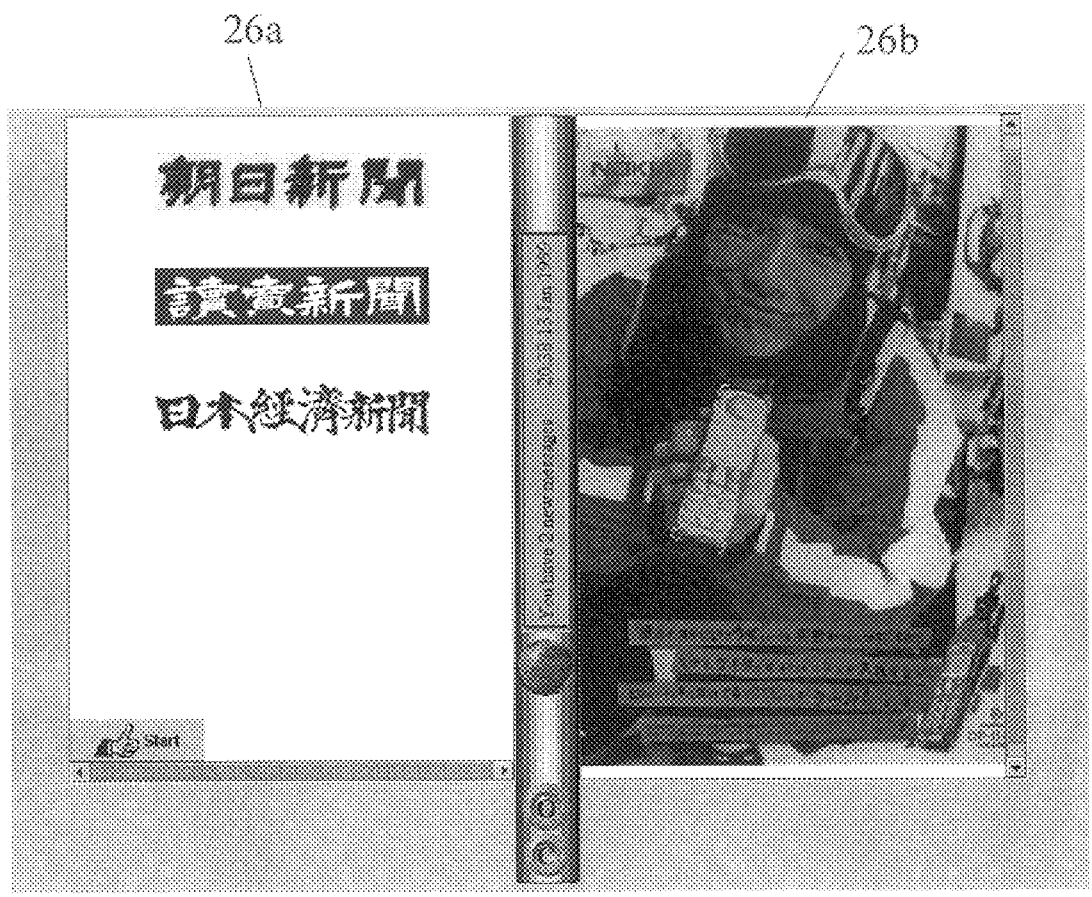
FIGS. 6 and 7 show the embodiment of FIG. 1 in a fully-opened position.
Figure 7:
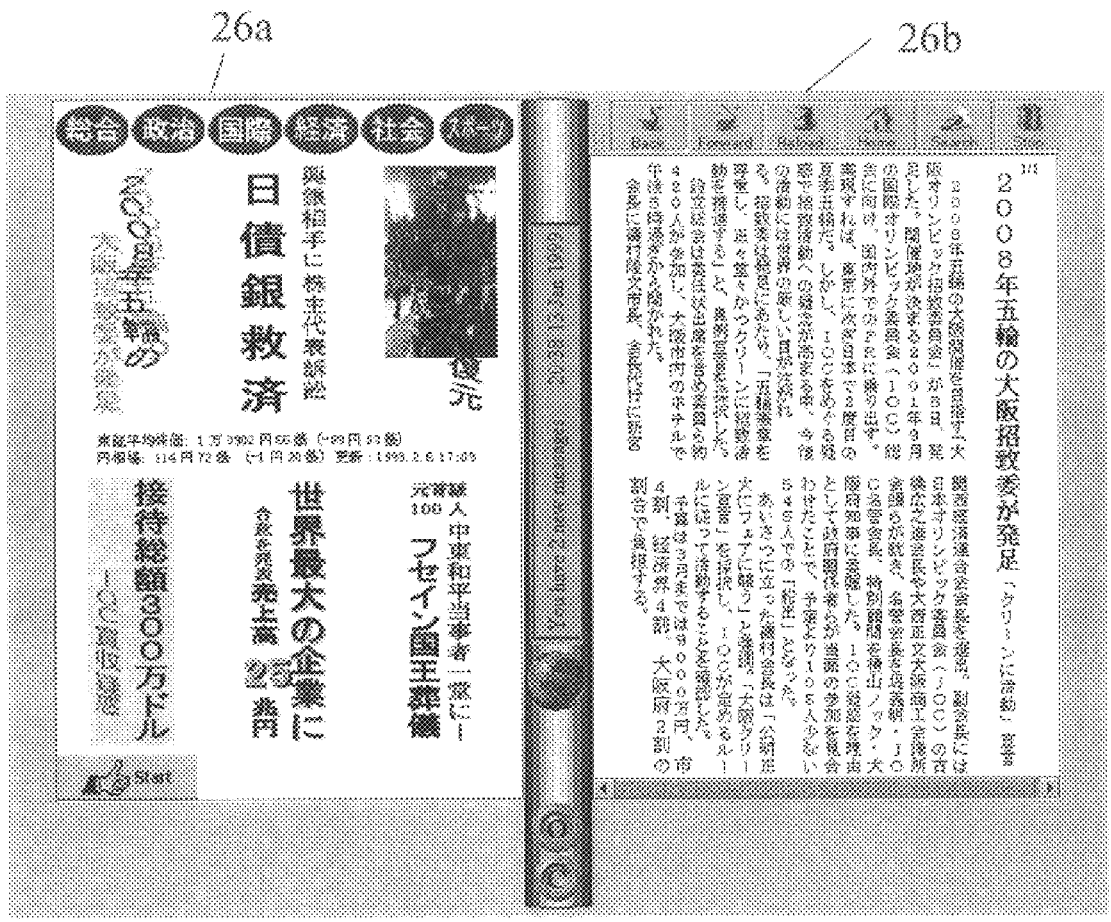

By depressing the open button 18, the screen 26 can be unraveled to its maximal size. FIGS. 6 and 7 show examples of the device displaying various items of content downloaded over the air from the internet.

The two screen portions 26a, 26b can operate depending on the application to act as a single large display or two independent displays.

When the user wishes to stop using the device, he depresses the open button 20 for a predetermined duration. The button depression is detected by the control unit 60. While the key is depressed, the control unit 60, via the motor controller 56, drives the motor 28, thereby causing the screen portions 26a and 26b to be steadily scrolled up and withdrawn into the housing 12.

It will be appreciated that the device is particularly suited to downlink intensive applications where a decent-sized display is desirable. Because the device can be readily held by one hand, it is very useable in difficult environments. Yet at the same time, because the screen can be rolled up so unobtrusively into the housing, the device is also extremely portable.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same to function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A display device comprising:
a stick-shaped housing holdable by a user in one hand during use; and
an electronically-writeable screen extendable from and retractable into the housing to provide a display for user-selected information.

2. The display device of claim 1, further comprising a user control means by which a user can adjust the degree to which the screen is extended.

3. The display device of claim 2, wherein the screen is extendable from a first state in which the screen is fully retracted within the housing, and a second state in which the screen is maximally extended from the housing.

4. The display device of claim 3, wherein the screen comprises first and second screen portions which are extendable in opposite directions from the housing.

5. The display device of claim 3, comprising a window formed in the housing through which a portion of the screen is viewable when in its first state.

6. The display device of claim 2, further comprising a motor responsive to the user control means for extending and retracting the screen.

7. The display device of claim 1, wherein the screen is extendable from a first state in which the screen is fully retracted within the housing, and a second state in which the screen is maximally extended from the housing.

8. The display device of claim 7, wherein the screen comprises first and second screen portions which are extendable in opposite directions from the housing.

9. The display device of claim 7, comprising a window formed in the housing through which a portion of the screen is viewable when in its first state.

10. The display device of claim 1, further comprising a circuit board arranged concentrically around a major axis of the housing.

11. The display device of claim 10, further comprising a battery contained within a volume defined by the circuit board.

12. The display device of claim 1, wherein the screen comprises first and second screen portions which are extendable in opposite directions from the housing.

13. A personal radio receiver comprising:
a display device comprising:
a stick-shaped housing holdable by a user in one hand during use; and
an electronically-writeable screen extendable from and retractable into the housing to provide a display for user-selected information; and
a radio transceiver within the housing.

14. A display device comprising:
a stick-shaped housing holdable by a user in one hand during use;
an electronically-writeable screen extendable from and retractable into the housing; and
a control means on the housing for controlling the information to be displayed on the screen.

15. The display device of claim 14, wherein the screen is extendable from a first state in which the screen is fully retracted within the housing, and a second state in which the screen is maximally extended from the housing.

16. The display device of claim 15, wherein the screen comprises first and second screen portions which are extendable in opposite direction from the housing.

17. The display device of claim 14, further comprising a circuit board arranged concentrically around a major axis of the housing.

18. The display device of claim 17, further comprising a battery contained within a volume defined by the circuit board.

* * * * *